United States Patent [19]

Abrams

[11] Patent Number: 5,348,325
[45] Date of Patent: Sep. 20, 1994

[54] PORTABLE, COLLAPSIBLE LUGGAGE CARRIER

[76] Inventor: Martin Abrams, 4408 Morse Ave., Lincolnwood, Ill. 60646

[21] Appl. No.: 29,349

[22] Filed: Mar. 8, 1993

Related U.S. Application Data

[63] Continuation of Ser. No. 775,801, Oct. 11, 1991, abandoned.

[51] Int. Cl.⁵ .................................................. B62B 1/04
[52] U.S. Cl. ........................................ 280/40; 280/655; 280/47.29
[58] Field of Search ................. 280/655, 654, 39, 38, 280/40, 47.29

[56] References Cited

U.S. PATENT DOCUMENTS

| | | | |
|---|---|---|---|
| 1,409,838 | 3/1922 | Emery et al. | 280/40 |
| 1,627,253 | 5/1927 | Shannon, Jr. | 280/47.29 |
| 3,306,661 | 2/1967 | Allen | 280/33.993 |
| 3,788,659 | 1/1974 | Allen | 280/654 |
| 3,947,054 | 3/1976 | Hall | 280/47.29 |
| 3,998,476 | 12/1976 | Kazmark, Sr. | 780/655 |
| 4,121,855 | 10/1978 | Mortenson | 280/654 |
| 4,448,434 | 5/1984 | Anderson | 280/40 |
| 4,506,897 | 3/1985 | Libit | 280/40 |
| 4,577,877 | 3/1986 | Kassai | 280/642 |
| 4,637,626 | 1/1987 | Foss et al. | 280/655 |
| 4,659,096 | 4/1987 | Leimgruber | 280/39 |
| 4,754,985 | 7/1988 | Im et al. | 280/40 |
| 4,917,392 | 4/1990 | Ambasz | 280/40 |
| 4,969,660 | 11/1990 | Spak | 280/655 |
| 4,989,889 | 2/1991 | Perez | 280/40 |
| 4,993,727 | 2/1991 | vom Braucke | 280/40 |

FOREIGN PATENT DOCUMENTS

| | | | |
|---|---|---|---|
| 250614 | 11/1966 | Australia | 280/38 |
| 728435 | 4/1932 | France | 280/47.29 |
| 7513895 | 6/1977 | Netherlands | 280/40 |
| 1486392 | 6/1989 | Russia | 280/655 |
| 1406272 | 9/1975 | United Kingdom | 280/40 |

OTHER PUBLICATIONS

P. 23 of the Oct. 1991 issue of Popular Science Illustration of an alleged new product designated "RuXX-Ac-cart" luggage trolley.

Primary Examiner—David M. Mitchell

[57] ABSTRACT

A luggage carrier is provided with a frame, handle, wheels, and pivotally mounted luggage support platform biased toward a storage position. A linkage arrangement is provided so that the wheels are pivoted to a collapsed, storage position when the platform moves to the storage position. In the storage position, the wheels overlap each other adjacent the frame. A latch is provided for holding the platform and wheels in the open, operative position. The frame is provided in a plurality of sections which can be unfolded to an extended configuration and locked into place. Release of the latch permits the platform and wheels to be automatically moved to the collapsed, storage position and permits one of the frame sections to be pivoted downwardly to a collapsed position.

11 Claims, 8 Drawing Sheets

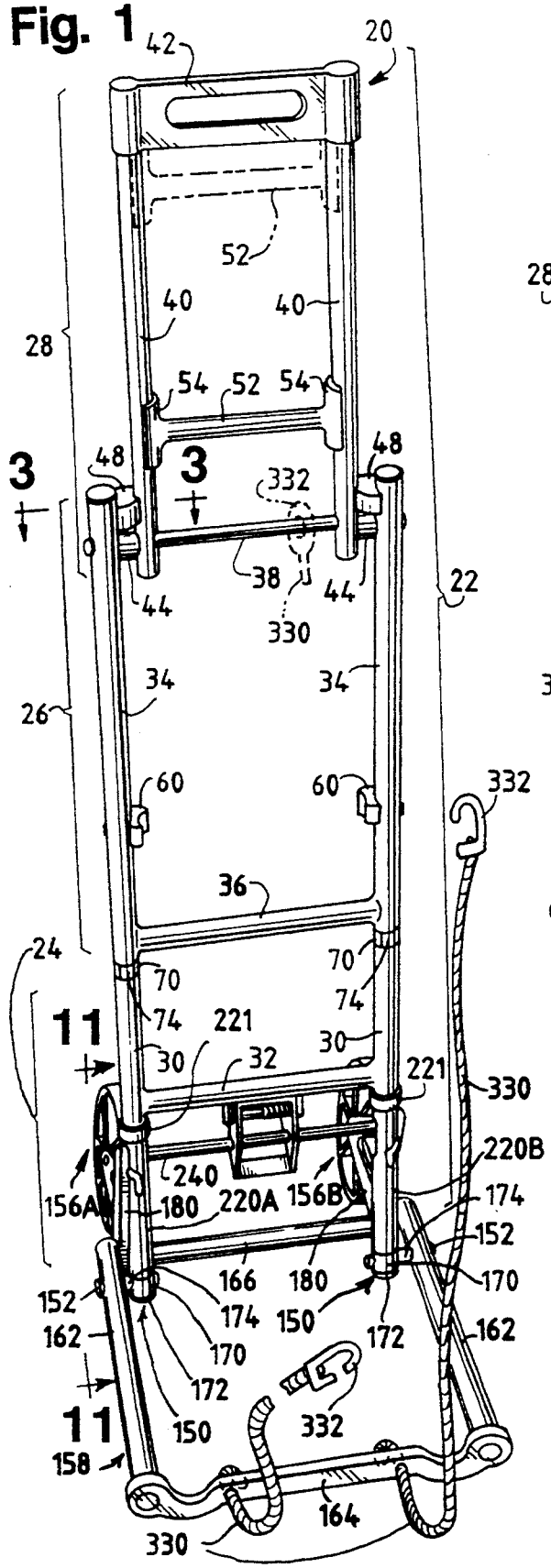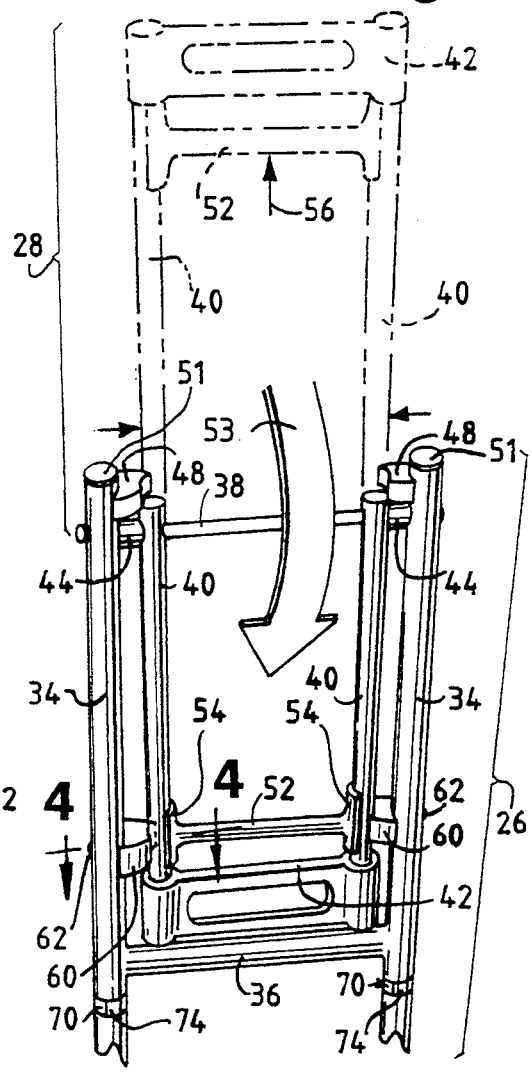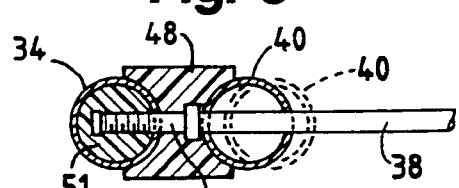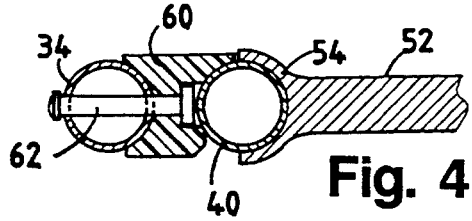

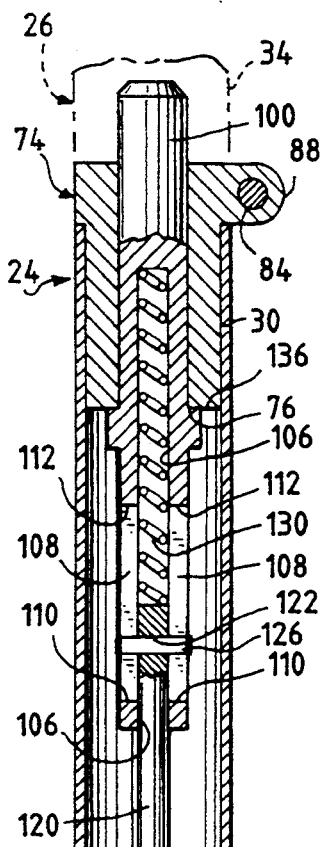
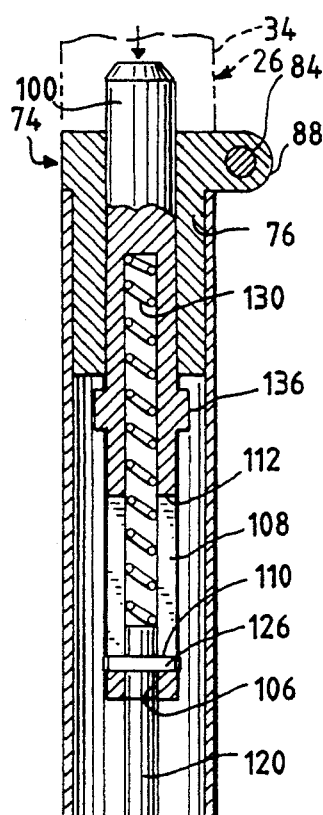
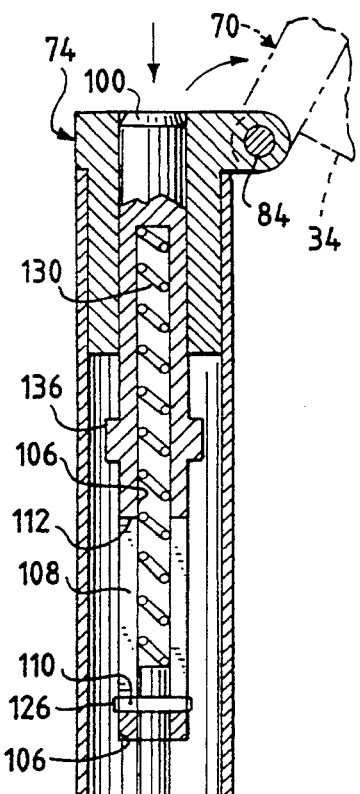
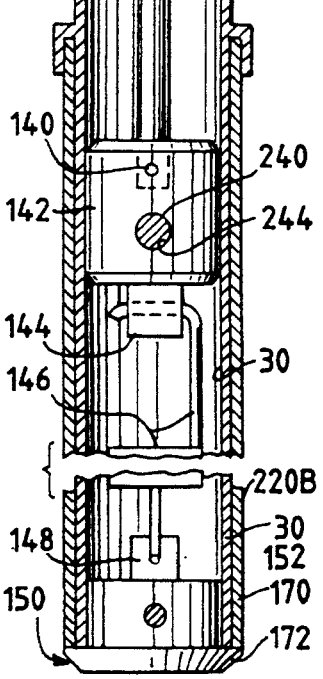
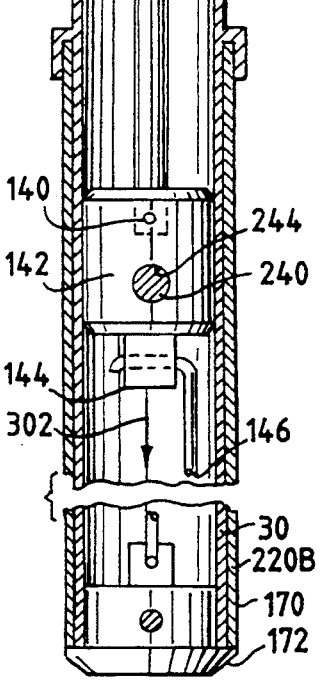
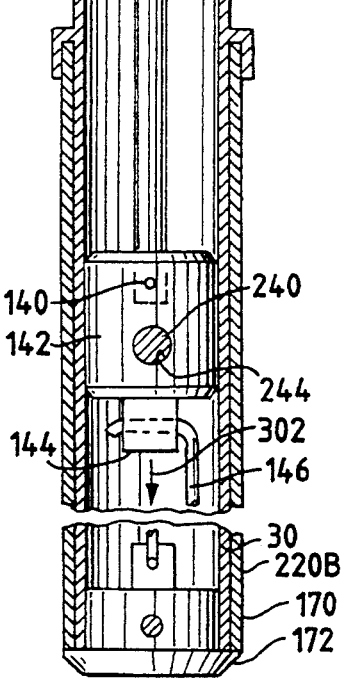
Fig. 8   Fig. 9   Fig. 10

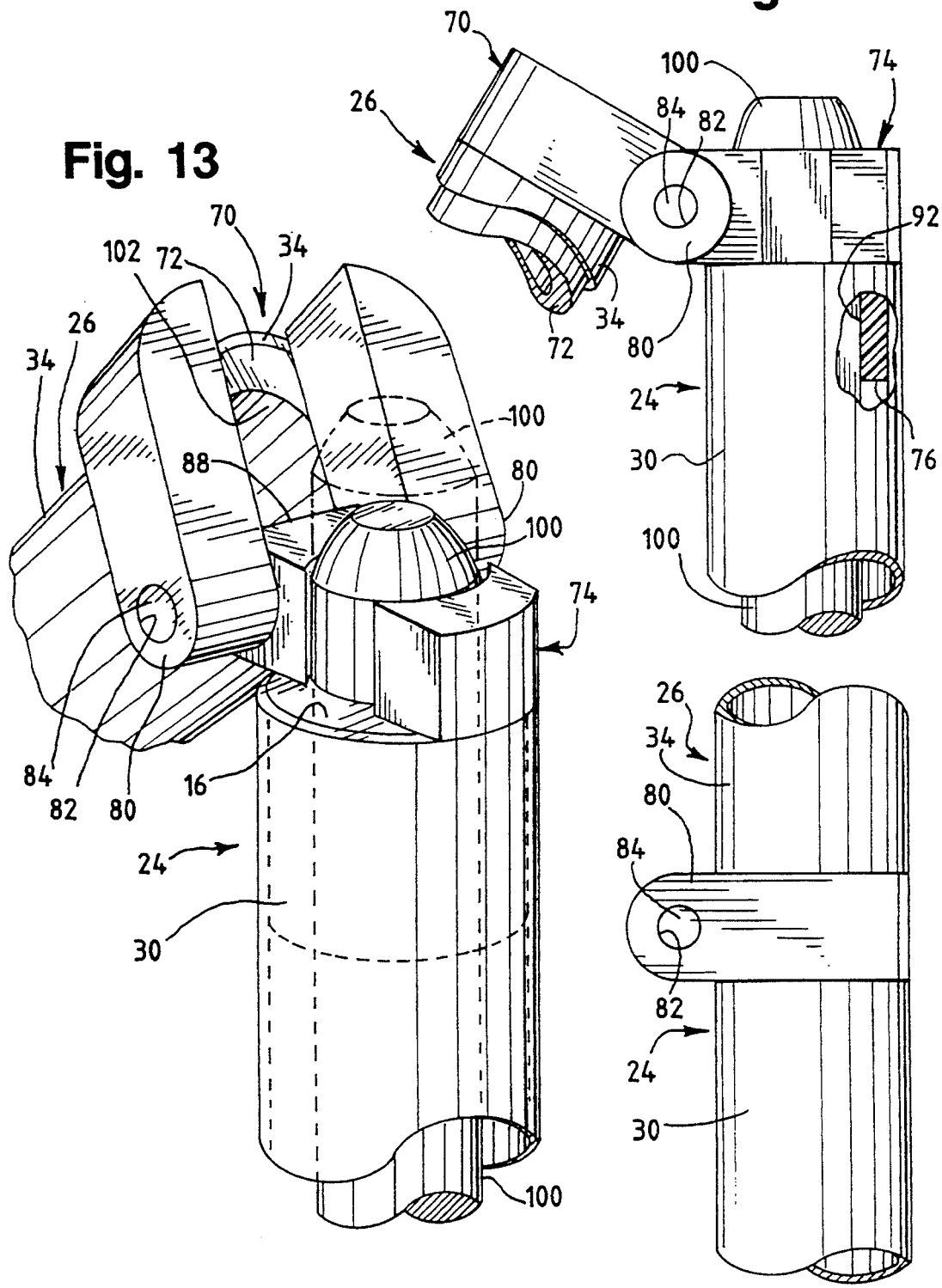

Fig. 16
Fig. 17
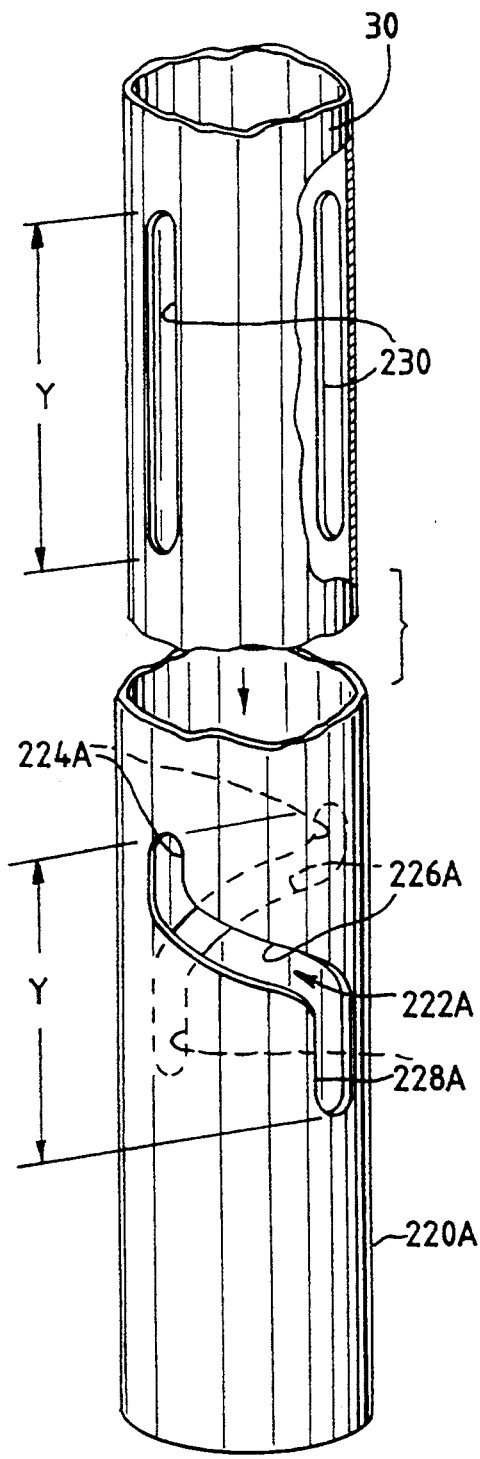
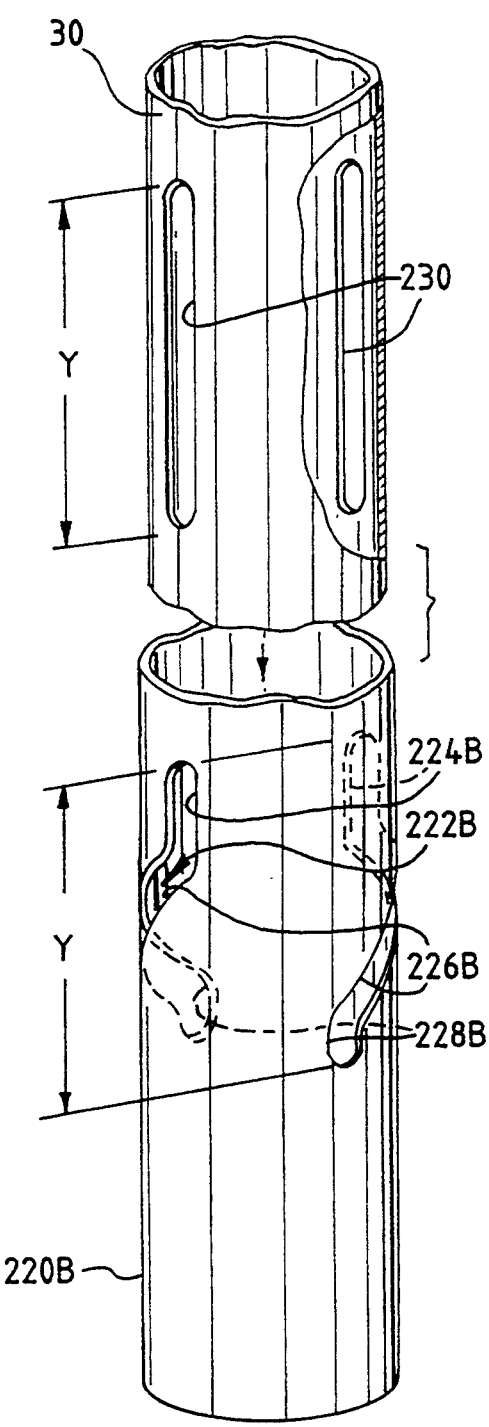

PORTABLE, COLLAPSIBLE LUGGAGE CARRIER

This application is a continuation of application Ser. No. 07/775,801 filed Oct. 11, 1991 now abandoned.

TECHNICAL FIELD

The present invention relates to two-wheel carts and, in particular, to collapsible, storable carts or carriers for transporting luggage and other articles.

BACKGROUND OF THE INVENTION AND TECHNICAL PROBLEMS POSED BY THE PRIOR ART

While there are a variety of relatively light weight, two-wheel carts adapted particularly for personal use, such as, by travelers to transport luggage and other articles, some of the carts are so light weight that they do not provide sufficient strength for carrying an adequate load, and/or cannot be collapsed into a package small enough to be conveniently carried when not being used.

Such two-wheel carts typically have a bottom portion or platform on which articles being carried are placed, and an upright frame which may be pivotally connected to the platform and which typically includes a handle. In the operative or erected position, such carts are generally L-shaped. When collapsed or closed, the platform is typically pivoted to lie against the frame. In many instances the upright frame is constructed of sections which can be folded or telescoped in an effort to render the cart compact for storage and carrying.

While some of these or carriers may function generally satisfactorily, some exhibit reduced strength, some have a relatively small platform, and some have a collapsed size which is not as small as would be desired.

It would be desirable to provide an improved luggage carrier which is relatively sturdy and which has a relatively large platform for carrying various loads.

It would be beneficial if such an improved carrier could be relatively quickly and easily deployed to an operative, extended position and be collapsed or closed to a storage position.

It would also be advantageous if such an improved carrier included provisions for automatically locking at least some of its parts in the operative position as well as in the collapsed position.

Such an improved carrier should also desirably be provided with a construction that permits the frame, support platform, and wheels to be collapsed to a closed or folded condition having a relatively thin, rectangular configuration for accommodating storage of the collapsed carrier in a suitcase, under a seat, or in some other storage container or location.

It would also be advantageous to provide such an improved carrier with a design that permits relatively efficient operation with respect to closing it into the collapsed configuration, opening it to the extended, operative configuration, and in using the opened carrier to transport articles.

Advantageously, such an improved carrier should also be of rugged construction and be substantially maintenance free.

The present invention provides an improved cart or carrier which can accommodate designs having the above-discussed benefits and features.

SUMMARY OF THE INVENTION

The present invention provides a portable, collapsible, luggage carrier having a frame, a luggage support platform, and wheels which may be of a relatively large diameter to improve stability and to render the carrier easier to use, such as when pulling the carrier over curbs or steps.

In a preferred embodiment, the user, while standing and holding the erected frame of the carrier, can open the platform and wheels to the operative position by merely pushing down on the frame. The user, while standing next to the preferred form of the carrier, can also effect automatic closure of the platform and wheels to the collapsed configuration by merely releasing a foot-operable latch. The carrier can be collapsed to a relatively small, folded configuration.

The preferred embodiment of the carrier employs relatively large diameter wheels which overlap each other when the wheels are in the collapsed, storage configuration. This permits the use of relatively large diameter wheels without requiring an increase in the carrier width.

Preferably, the carrier frame is provided in sections which may be folded together in the collapsed configuration. In the preferred embodiment, unique means are provided for effecting a strong joint between the folding frame sections and for automatically locking the frame sections together in response to movement of the luggage support platform to the extended, operative position. Further, the preferred embodiment of the carrier includes a unique design which permits the unfolding of the frame sections to the extended, locked, operative position even if the luggage support platform is already in the extended, operative position.

In particular, one aspect of the improved carrier of the present invention includes a frame and handle carried thereon with a luggage support platform pivotally mounted to the frame. The platform is movable between (1) a collapsed, inoperative, storage position adjacent the frame in an overlapping relationship therewith and (2) an extended, operative position projecting outwardly from the frame. A pair of wheel carriages are mounted on the frame, and each carriage has a rotatable wheel. A pair of spaced-apart carriage mounting means are provided for mounting the carriages on the frame for pivoting movement between (1) a collapsed, inoperative, storage position in which the wheels overlap each other adjacent the frame and (2) an extended, operative position in which the wheels are disposed generally parallel to each other for rotation about a common axis. A cam actuation means is incorporated in this embodiment of the invention for effecting pivoting movement of the carriages in response to pivoting movement of the platform relative to the frame.

According to another aspect of the invention, a carrier is provided with a frame, handle, wheel means, and a pivotally mounted luggage support platform. A platform biasing means urges the platform toward a storage position. A releasable latch means is provided for being moved between a latched position to retain the platform in an operative position and a released position to permit the platform to be moved to the storage position by the platform biasing means.

Finally, another aspect of the invention provides a carrier which has a frame, handle, wheel means, and pivotally mounted luggage support platform biased toward a storage position—and which may or may not include a latch as previously described. However, the frame further preferably includes a lower frame section and an upper frame section pivotally mounted to the lower frame section for movement between (1) an extended, operative position and (2) a collapsed, inoperative storage position adjacent the lower frame section. The lower frame section includes at least one pin mounted for reciprocative movement in, and relative to, the lower frame section for projecting from, and being retracted into, the lower frame section. The upper frame section has one end defining at least one receiving cavity for receiving a portion of the pin. A connecting means is provided for connecting the platform with the pin to move the pin (1) out of the receiving cavity when the platform is moved to the storage position, and (2) into the receiving cavity if the platform is moved to its operative position while the upper frame section is in its operative position whereby relative transverse displacement of the upper and lower frame sections is prevented.

Numerous other advantages and features of the present invention will become readily apparent from the following detailed description of the invention, from the claims, and from the accompanying drawings.

BRIEF DESCRIPTION OF THE DRAWINGS

In the accompanying drawings that form part of the specification, and in which like numerals are employed to designate like parts throughout the same, FIG. 1 is a perspective view of the portable, collapsible, luggage carrier of the present invention with the frame, wheels, and luggage support platform shown in the opened or extended, operative configuration;

FIG. 2 is a fragmentary, perspective view similar to FIG. 1 showing the orientation of the handle section in the folded down position;

FIG. 3 is a greatly enlarged, fragmentary, cross-sectional view taken generally along the plane 3—3 in FIG. 1;

FIG. 4 is a greatly enlarged, fragmentary, cross-sectional view taken generally along the plane 4—4 in FIG. 2;

FIG. 8 is a greatly enlarged, fragmentary, cross-sectional view taken generally along the plane 8—8 in FIG. 5;

FIG. 9 is a greatly enlarged, fragmentary, cross-sectional view taken generally along the plane 9—9 in FIG. 6;

FIG. 10 is a greatly enlarged, fragmentary, cross-sectional view taken generally along the plane 10—10 in FIG. 7;

FIG. 13 is a greatly enlarged, fragmentary, perspective view of the hinged connection of one of the pairs of upper and lower frame section tubes shown in FIG. 7;

FIG. 14 is a reduced scale, side elevational view of the hinged connection shown in FIG. 13;

FIG. 15 is a view similar to FIG. 14 showing the hinged connection in the locked closed configuration;

FIG. 16 is a fragmentary, exploded, perspective view of one of the frame tubes and associated barrel cam sleeve mounted thereon; and FIG. 17 is a fragmentary, exploded, perspective view of another one of the frame tubes and associated barrel cam sleeve mounted thereon, the sleeve being rotated somewhat compared to the sleeve shown in FIG. 16.

DESCRIPTION OF THE PREFERRED EMBODIMENT

Figure 5:
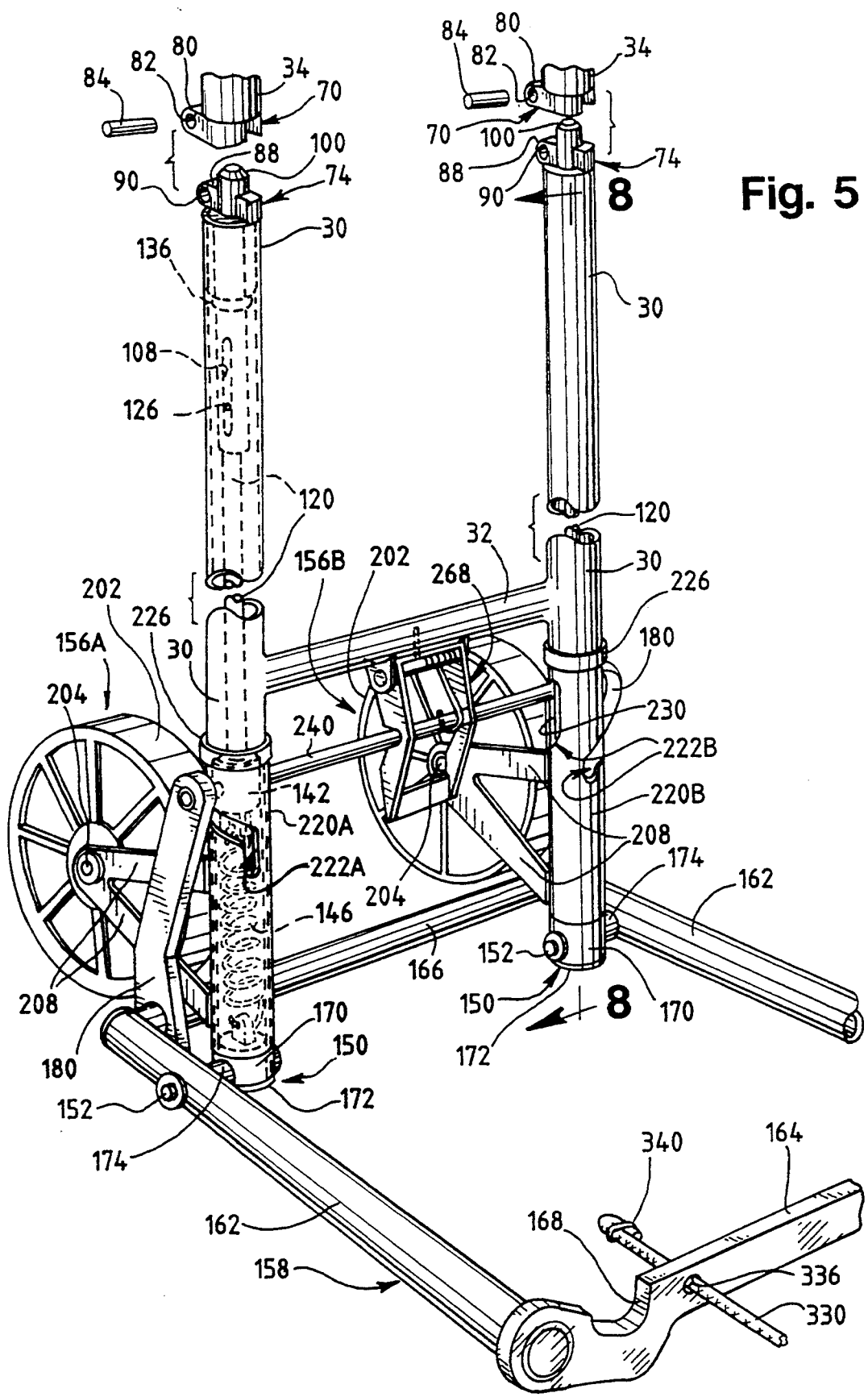
FIG. 5 is a greatly enlarged, fragmentary, partially exploded, perspective view of the lower portion of the carrier shown in FIG. 1 with certain interior components illustrated in phantom by dashed lines.

While this invention is susceptible of embodiment in many different forms, this specification and the accompanying drawings disclose only one specific form as an example of the invention. The invention is not intended to be limited to the embodiment so described, however. The scope of the invention is pointed out in the appended claims.

For ease of description, the carrier of this invention is described in the normal (upright) operating position, and terms such as upper, lower, horizontal, etc., are used with reference to this position. It will be understood, however, that the carrier of this invention may be manufactured, stored, transported, used, and sold in an orientation other than the position described.

Some of the figures illustrating an embodiment of the carrier show structural details and mechanical elements that will be recognized by one skilled in the art. However, the detailed descriptions of such elements are not necessary to an understanding of the invention, and accordingly, are not herein presented.

According to the present invention, a novel cart, which may conveniently function as a luggage carrier or the like, is constructed in a manner which permits the carrier to be relatively easily and quickly collapsed into a substantially flat, inoperative, closed configuration for storage and which permits the collapsed carrier to be relatively easily and quickly opened or extended into the operative configuration for use. A preferred form of the carrier can incorporate relatively large wheels for easier rolling on various surfaces and over curbs, steps, and the like. In the preferred form of the carrier, the wheels are driven between the open, operative positions and the collapsed, inoperative positions in response to movement of the luggage support platform as the platform moves between the extended, operative position and the collapsed, inoperative position. Automatic latching means are easily provided for maintaining the support platform and wheels in the operative position. In addition, the preferred form of the carrier includes foldable frame sections with retention means and automatic locking means.

A preferred combination of features of the invention is incorporated in the carrier 20 illustrated generally in FIG. 1. The carrier 20 includes a generally upright frame 22. The frame 22 has a lower frame section 24, an upper frame section 26, and a handle section 28. The lower frame section 24 includes a pair of tubes 30 and a rigidifying connecting tube 32. The upper frame section 26 includes a pair of parallel tubes 34 and a connecting tube 36. The handle section 28 is mounted to the upper ends of the tubes 34. To this end, the tubes 34 are connected adjacent their upper ends by a shaft or axle 38. The handle section 28 includes a pair of tubes 40 which are mounted adjacent their lower ends on the shaft 38. The upper ends of the handle section tubes 40 are connected by a handle 42.

As best illustrated in FIGS. 1 and 2, a pair of spacers 44 are provided on the shaft 38. Each spacer 44 is positioned between one of the handle section tubes 40 and an adjacent upper frame section tube 34. A bracket 48 is mounted to the upper end of each frame section tube 34 above one of the spacers 44. Each upper retention bracket 48 is mounted to a upper frame section tube 34 with a suitable fastener, such as a button head screw 49 threadingly engaged with an end plug cap 51 mounted in the end of the tube 34. The bracket 48 has an inwardly facing, partially cylindrical, concave surface for mating with an exterior portion of the surface of the adjacent handle section tube 40 as shown in solid lines in FIG. 3.

A sliding brace 52 is mounted between the handle section tubes 40. The brace 52 has a pair of oppositely directed slide members 54. Each slide member 54 has a concave, partially cylindrical surface for engaging a portion of the cylindrical surface of an adjacent handle section tube 40. The brace 52 is slidable vertically along the handle section 28 between a release position adjacent the handle 42 as shown in phantom by dashed lines in FIG. 1 and a lowered, clamping position as shown by solid lines in FIG. 1. When the brace 52 is in the lowered, clamping position, the handle section tubes 40 are maintained generally parallel and are prevented from being pushed inwardly toward each other. This effects a tight engagement between each handle section tube 40 and the adjacent, mating retention bracket 48.

When it is desired to collapse or fold the handle section 28 to an inoperative, storage position, the handle section 28 may be rotated forwardly in the direction of arrow 53 as illustrated in FIG. 2 so as to position the handle section 28 in a generally planar relationship relative to the upper frame section 26. This is accomplished by pulling upwardly on the brace 52 (in the direction of the arrow 56 in FIG. 2). This permits the lower ends of the handle section tubes 40 to be forced inwardly toward each other. As the handle section 28 is pivoted forwardly in the direction of the arrow 53 as shown in FIG. 2, the concave surfaces of the retention brackets 48 cam the handle section tubes 40 inwardly (toward the position shown in phantom by dashed lines in FIG. 3) so that the handle section 28 is released from the retention brackets 48.

When the handle section 28 is fully inverted as shown in solid lines in FIG. 2, it may be retained in the inverted position by retention brackets 60 which are each mounted with a rivet 62 to one of the upper frame section tubes 34 as illustrated in FIGS. 2 and 4. Each retention bracket 60 has a concave, partially cylindrical surface for mating with an exterior surface portion of the adjacent tube 40. To facilitate engagement of the tubes 40 with the lower retention brackets 60, the brace 52 may be slid upwardly (toward the shaft 38) momentarily to allow the tubes 40 to be more easily cammed inwardly as the tubes 40 engage the lower retention bracket 60. Subsequently, the brace 52 may be slid back toward the handle 42 to prevent the tubes 40 from deflecting inwardly and to thereby lock the collapsed handle section 28 in the inoperative position.

The upper frame section tubes 34 are hingedly connected to the lower frame section tubes 30 to permit pivoting movement of the upper frame section 26 relative to the lower frame section 24 as illustrated in FIGS. 5, 7, and 13–15.

In particular, a first hinge part 70 is provided with an annular base 72 inserted into the end of the tube 34 as shown in FIGS. 13 and 14. The hinge part base 72 is secured in tube 34 by a suitable means (such as a set screw which is not visible). The hinge includes a second part 74 which has an annular base 76 which is inserted in the open end of the tube 30 and secured therein by suitable means (such as a set screw which is not visible).

The hinge first part 70 includes a pair of spaced-apart, rearwardly extending, bearing portions 80 which each define a bore 82 for receiving a hinge pin 84. The second hinge part 74 includes a rearwardly extending portion 88 (FIGS. 5 and 13) which fits between the rearwardly extending portions 80 of the first hinge part 70. The second hinge part portion 88 defines a bore 90 (FIG. 5) which is in registry with the bores 82 in the first hinge part 70 for receiving a portion of the pin 84.

The second hinge part 74 defines an internal bore 92 for receiving a pin 100 which is slidably disposed within the second hinge part 74 and which extends into the tube 30 as is described in more detail hereinafter. The first hinge part 70 also defines a receiving cavity or bore 102 (FIG. 13) for receiving the projecting portion of the pin 100.

Figure 7:
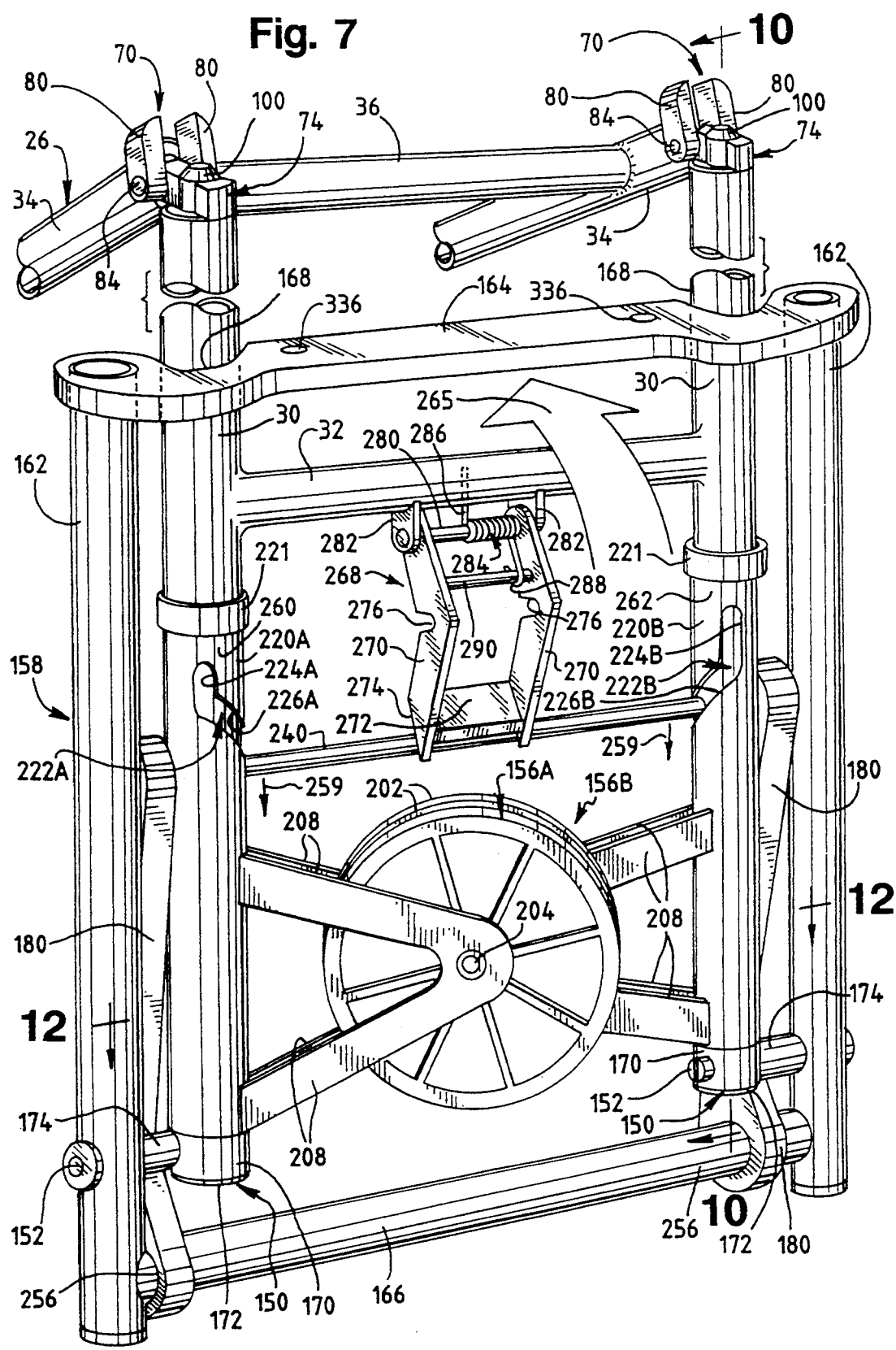
FIG. 7 is an enlarged, fragmentary, perspective view similar to FIG. 6 and shows the wheels and luggage support platform in the fully closed or collapsed, inoperative, storage configuration.

The hinge parts 70 and 74 can be opened to fold the upper frame section 28 rearwardly as shown in FIGS. 7 and 13 after the pin 100 is retracted through the second hinge part 74 and further into the tube 30 (as shown in solid lines in FIGS. 10 and 13) by means described in detail hereinafter. When the pin 100 is fully extended (as shown in solid lines in FIG. 8 and as shown in phantom by dashed lines in FIG. 13), the pin 100 functions to prevent relative transverse displacement of the upper and lower frame sections 26 and 24, respectively.

As illustrated in FIGS. 8–10, the pin 100 includes an upper end or outer end which is adapted to project beyond the lower frame section tube 30 and into the upper frame section tube 34. The pin 100 has a lower end or inner end extending oppositely away from the outer end into the lower frame section tube 30. The lower end of the pin 100 defines a bore 106 which opens downwardly inside the tube 30. A slot 108 is defined by the pin 100 along a portion of the depth of the bore 106. The slot 108 terminates short of the open end of the bore 106 at a slot lower end 110, and the slot 108 terminates short of the upper end of the bore 106 at an end wall 112. The slot 108 communicates at least with the interior of the bore 106. Preferably, the slot 108 extends completely through a diameter of the pin 100 as illustrated.

A connecting rod 120 is provided with an upper end or first end received within the pin bore 106. The upper end of the rod 120 defines a bore 122 in registry with the slot 108 for receiving a cylindrical guide arm or pin 126. The pin 126 is adapted to travel within the slot 108, and the range of longitudinal movement of the pin 126 along the slot 108 is limited by the slot end walls 110 and 112. A compression spring 130 is disposed within the pin bore 106 and is trapped therein by the distal end of the rod 120. The spring 130 continuously urges the pin 100 and the rod 120 to move away from each other in opposite directions. The slot 108 and pin 126 define a lost motion connection between the pin 100 and the rod 120.

The pin 100 also includes an exterior abutment flange 136 for limiting the upward movement of the pin 100 under influence of the compression spring 130. In particular, as shown in FIG. 8, the maximum extended position or projecting position of the pin 100 is limited by the engagement of the flange 136 with the bottom of the first hinge part annular base 76.

The lower end of the rod 120 is mounted with a pin 140 to a slidable connecting block 142. The bottom of the connecting block 142 has a downwardly projecting bracket 144 for receiving the upper end of a spring 146. The spring 146 is secured at its lower end to a bracket 148 projecting upwardly from an end cap 150 which is mounted to the bottom end of the tube 30 and which is secured therein with a shaft or pin 152. The spring 146 thus tends to pull the rod 120 toward the bottom of the first frame section tube 30.

The carrier 20 includes wheel means or carriages 156A and 156B and also includes a luggage support platform 158 (FIGS. 1, 5, 6, 7, 11, and 12) which are adapted to move generally together between an extended, operative position (FIGS. 1 and 5) and a collapsed, inoperative, storage position (FIG. 7). Movement of the wheel carriages and platform between these two positions is effected via the above-described tension spring 146, connector block 142, and other components as explained in more detail hereinafter.

The luggage support platform 158 includes a pair of generally parallel tubes 162 which are connected at their front ends by a transversely disposed member 164 and at their rear end by a transversely disposed cross tube 166. The member 164 defines a pair of spaced-apart cut outs or recesses 168 for accommodating the first frame section tubes 30 when the platform 158 is in the fully collapsed position (FIG. 7).

The platform side tubes 162 are each pivotally mounted about a common axis on one of the pins 152 which secures the end cap 150 to the bottom of the tube 30. A circumferential spacer ring 170 is retained on the lower end of each lower frame section tube 30 by an enlarged head 172 which projects from the end cap 150. The ring 170 has a suitable aperture for accommodating the pin 152 extending therethrough.

A bushing or spacer member 174 is provided on each pin 152 between the ring 170 and one of the platform side tubes 162. The spacers 174 facilitate the pivoting movement of the platform 158 wherein the side tubes 162 pivot upwardly adjacent the lower frame section tubes 30. The spacers 174 also accommodate special drive links 180 which move between the platform side tubes 162 and the lower frame section 24 as part of a cam actuation means or system which effects pivoting movement of the wheel means or wheel carriages 156 in response to pivoting movement of the platform 158 relative to the first frame section 24.

In particular, each wheel means 156A and 156B includes a wheel 202 mounted to an axle 204 which is in turn mounted between two spaced-apart, generally parallel, support brackets 208. Each wheel 202, along with its associated axle 204 and associated pair of brackets 208, may be characterized or defined as the wheel carriage 156A or 156B.

The brackets 208 associated with the wheel carriage 156A are attached to a carriage mounting means in the form of a barrel cam sleeve 220A. The brackets 208 associated with the wheel carriage 156B are attached to another carriage mounting means or barrel cam sleeve 220B. Each sleeve 220A and 220B is disposed for rotation on, and relative to, a lower end of one of the lower frame section tubes 30. In particular, the lower end of each sleeve 220A and 220B bears on the upper annular end of the fixed ring 170 at the lower end of a tube 30, and the upper end of each sleeve 220A and 220B is captured by a retention ring 221 which is fixed to the exterior of the tube 30 (FIGS. 8–9, 5, and 7). Each sleeve 220A or 220B can be rotated about its longitudinal axis which is coincident with the axis of the associated tube 30 about which the sleeve is mounted in a concentric arrangement.

Each sleeve 220A and 220B defines a pair of cam tracks or slots. Sleeve 220A defines two, identical cam track slots 222A which are 180° apart. Each slot 222A has an upper vertical portion 224A, an angled central portion 226A, and a lower vertical portion 228A. Similarly, sleeve 220B defines two, identical cam track slots 222B which are 180° apart. Each slot has an upper vertical portion 224B, an angled central portion 226B, and a lower vertical portion 228B.

For reasons explained hereinafter, the length of each upper vertical portion 224A in the sleeve 220A is less than the length of each similar upper vertical portion 224B in the sleeve 220B. Also, the length of each lower vertical portion 228A in the sleeve 220A is longer than the length of each similar lower vertical portion 228B in the sleeve 220B. However, the overall vertical height Y of each slot 222A (as shown in FIG. 16) is equal to the overall vertical height Y of each slot 222B (as shown in FIG. 17).

As illustrated in FIGS. 16 and 17, the portion of each tube 30 that is received in one of the sleeves 220A or 220B defines a pair of diametrically opposite vertical slots 230. The height Y of each slot 230 is equal to the height of each cam track 222A and 222B in the sleeves 220A and 220B, respectively.

The sleeves 220A and 220B are each positioned on the lower ends of the tubes 30 at an elevation such that (1) the top of each cam track slot 222A of the sleeve 220A is in registry with the top of each slot 230 in the tube 30 disposed therein and (2) the bottom of each cam track slot 222A of the sleeve 220A is in registry with the bottoms of the slots 230 in the tube 30 disposed therein.

The sleeve 220B is mounted on the other tube 30 in an analogous arrangement so that the tops and bottoms of each cam track slot 222B in the sleeve 220B are in registry with the tops and bottoms of the slots 230 in the tube 30 which is disposed within the sleeve 220B.

Figure 6:
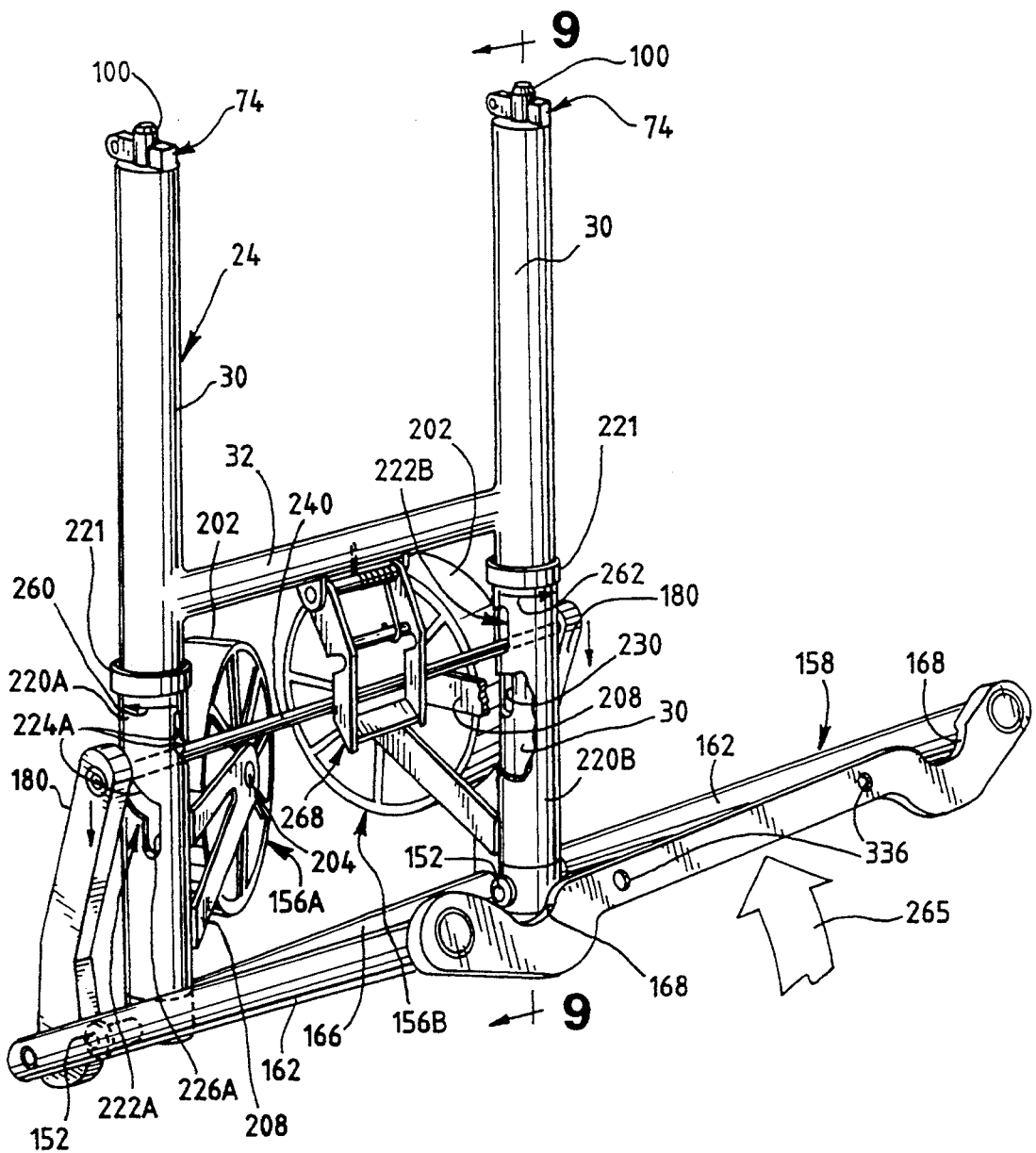
FIG. 6 is a view similar to FIG. 5 and shows the luggage support platform and wheels moving toward the closed or collapsed, inoperative, storage configuration.

The slots 230 in the tubes 30 and the cam track slots 222A and 222B in the sleeves 220A and 220B, respectively, are adapted to receive a drive shaft 240 as illustrated in FIGS. 5, 6, and 7. The shaft 240 extends across the lower frame section 24 parallel to the lower frame section cross tube 32. The shaft 240 functions to, among other things, make the lower frame section more rigid. The shaft 240 also functions to effect an operative engagement between the platform 158, wheel carriages 156A and 156B, and the tube tension springs 146 as described hereinafter.

The shaft 240 is mounted within each lower frame section tube 30 to the slidable connector block 142 which defines a bore 244 for receiving the shaft 240. The shaft 240 is thus biased downwardly by the springs 146 attached to the connector blocks 142. However, when the platform 158 is in the open, operative position (FIGS. 1, 5, and 11), the shaft 240 is preferably latched at its maximum elevation by a latch assembly 268 which is described in detail hereinafter.

The shaft 240 extends outwardly through each tube 30, through the cam tracks 222A and 222B in the sleeves 220A and 220B, respectively, and through the links 180. The upper end of each link 180 defines a bore (not visible in Figures) for receiving a distal end portion of the shaft 240.

Figure 11:
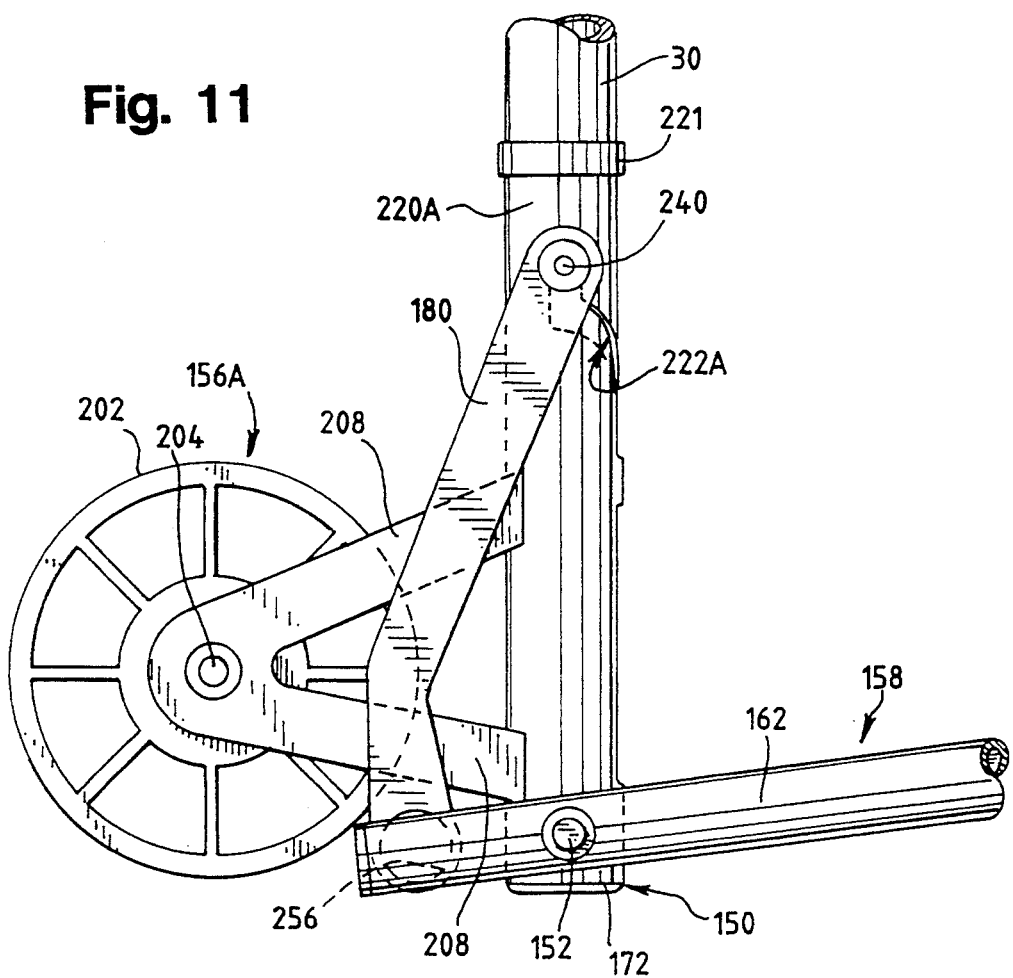
FIG. 11 is a greatly enlarged, fragmentary, side elevational view taken generally along the plane 11—11 in FIG. 1.

The bottom end of each link 180 defines a bore 256 (FIG. 7) for accommodating the pivotal mounting of the link 180 on the luggage support platform rear cross tube 166. As can be seen in FIGS. 7 and 11, each link 180 is angled in a region intermediate its ends so as to clear the adjacent spacer 174 when the platform 158 is in the folded, inoperative, storage position (as shown in FIG. 7).

The cam track slot 222A defined by the sleeve 220A and the cam track slot 222B defined by the sleeve 220B may be characterized as first and second cam elements, respectively, for cooperatively engaging the drive shaft 240. The shaft 240 may be characterized as a third cam element.

When the carrier 20 is to be collapsed, the latch 268 is released, and the lowered luggage support platform 158 (as shown in FIG. 11) is permitted to be automatically pivoted upwardly (by the springs 146) to the closed, inoperative position (as shown in FIG. 7). In particular, the springs 146 pull the connector blocks 142 and shaft 240 downwardly in the tubes 30 and sleeves 220A and 220B to cause the links 180 to move downwardly (in the direction of arrows 159 in FIG. 7) and pivot the platform 158 upwardly to the collapsed position (FIG. 7).

As explained in detail hereinafter, the drive shaft 240 moves vertically downwardly within the lower frame section tube slots 230 (FIGS. 16 and 17) and necessarily engages the edges of the cam track slots 222A and 222B to effect a rotation of the sleeves 220A and 220B in opposite directions as indicated by the arrows 260 and 262 in FIG. 7. Rotation of the sleeves 220A and 220B carries the wheel assemblies or carriages 156A and 156B from the extended, operative position (FIG. 5) to the collapsed, inoperative, storage position (FIGS. 7 and 11).

Figure 12:
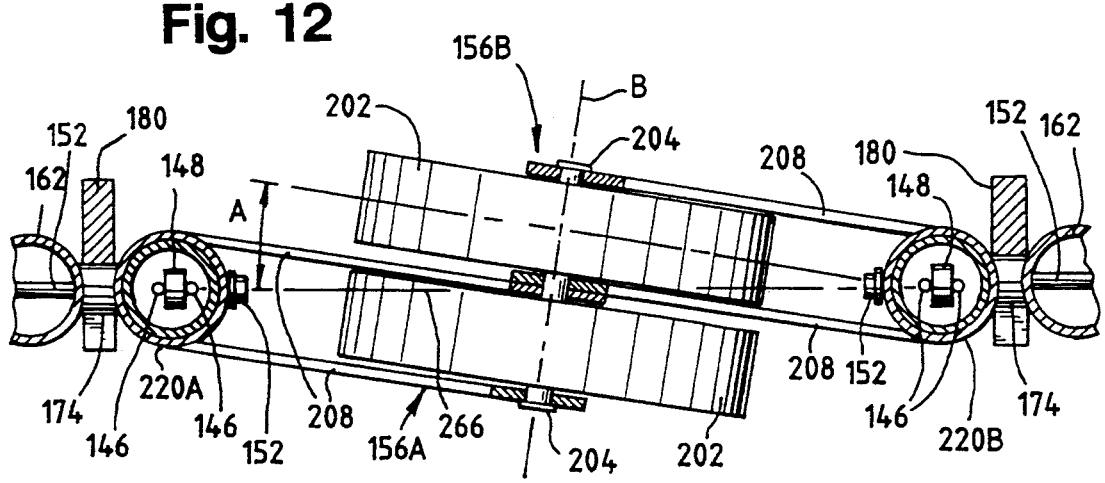
FIG. 12 is a fragmentary, cross-sectional view taken generally along the plane 12—12 in FIG. 7.

It will be appreciated that the carriages 156A and 156B overlap each other adjacent the lower frame section 24 when the wheel carriages are in the collapsed, inoperative position (FIGS. 7, 11, and 12). The wheel carriages 156A and 156B, along with the cam actuation system, are designed to permit the carriages to assume a relatively compact, collapsed position (FIG. 12) and are designed to insure that the carriages do not interfere with each other as they move between the open, operative position and the collapsed, inoperative position.

In particular, as best illustrated in FIG. 12, the wheel carriages 156A and 156B are mounted to the rotatable sleeves 220A and 220B, respectively, so that the wheel carriages lie at an angle to the plane of the lower frame section when the wheel carriages are in the collapsed configuration. The plane of the lower frame section can be characterized as being defined along the imaginary plane 266 which is illustrated in FIG. 12 and which extends between the spaced-apart axes of rotation of the sleeves 220A and 220B. In the collapsed configuration, the wheel carriage 156A projects from one side of the plane 266, and the wheel carriage 156B projects from the opposite side of the plane 266 by an equal amount. Both carriages 156A and 156B are oriented at an angle A to the imaginary plane 266. Thus, when the wheels 202 are in the collapsed position illustrated in FIG. 12, the axis of rotation of each wheel 202, shown as axis B in FIG. 12, defines an acute angle relative to the plane 266, and this acute angle is the complement of the angle A.

The angled, overlapping, storage orientation of the wheel carriages 156A and 156B results from the attachment of the wheel brackets 208 to the sleeves 220A and 220B at the appropriate circumferential points on the sleeves relative to the sleeve cam tracks.

The wheel carriages 156A and 156B do not interfere with each other as they are pivoted to the collapsed, inoperative, storage position (FIG. 12) because the cam tracks of the sleeves 220A and 220B are not identical. If the latch 268 is released (as described in detail hereinafter), the platform 158 will be automatically pivoted upwardly to the storage position and effect collapse of the wheel carriages. As described in detail above, the track 222A of the sleeve 220A has an upper vertical slot portion 224A which is shorter than the corresponding upper vertical slot portion 224B of the other sleeve 220B. Accordingly, as the drive shaft 240 is pulled downwardly by the tension springs 146 and the platform 158 is pivoted upwardly, one end portion of the shaft 240 engages the slot portion 226A in the sleeve 220A while the other end of the shaft 240 is still traveling downwardly in the longer, upper vertical slot portion 224B of the sleeve 220B.

The shaft 240 causes the sleeve 220A to rotate as the shaft 240 engages the edges of the angled cam slot portion 226A. However, during the initial rotation of the sleeve 220A, the sleeve 220B is not rotated because the shaft 240 is still traveling downwardly in the longer, upper vertical cam slot portion 224B.

The initial rotation of the sleeve 220A, prior to initiation of rotation of the sleeve 220B, causes the wheel carriage 156A to begin to pivot inwardly from the extended, operative position toward the collapsed, inoperative, storage position (an intermediate position of the carriage 156A being shown in FIG. 6). This permits the wheel carriage 156A to initially pivot inwardly far enough so that it will not interfere with the subsequent inward pivoting movement of the wheel carriage 156B.

Eventually, the drive shaft 240 is pulled downwardly far enough by the tension springs 146 so that the shaft 240 leaves the bottom of the upper slot portion 224B in the sleeve 220B and enters the angled portion 226B. This initiates rotation of the sleeve 220B (in the direction of the arrow 262 in FIG. 6) so as to begin to pivot the wheel carriage 156B inwardly toward the collapsed, inoperative, storage position in overlapping relationship relative to the wheel carriage 156A.

As the shaft 240 is pulled further downwardly, the shaft 240 enters the lower, vertical cam track portion 228A in the sleeve 220A. This causes the sleeve 220, and the attached carriage 156A, to be maintained in the fully rotated, storage position (FIG. 7). The slot 228A is long enough to permit continued downward movement of the shaft 240 so that the shaft 240 can continue to engage the angled cam track slot portion 226B in the sleeve 220B and complete the pivoting movement of the wheel carriage 156B to its fully collapsed, inoperative, storage position (FIG. 7). The lower, vertical cam track portion 228A of the sleeve 220A is also long enough to permit continued downward movement of the drive shaft 240 so that the shaft 240 can enter the lower, vertical cam slot portion 228B in the sleeve 220B to retain the sleeve 220B, and hence the wheel carriage 156B, in the fully rotated, storage position (FIG. 7).

It will be apparent that if the platform 158 is pivoted from the collapsed, inoperative position (FIG. 7) downwardly to the extended, operative position (FIG. 11), then the wheels will automatically pivot from the storage position to the extended, operative position. In particular, the platform 158 can be opened by pulling on the front of the platform to pivot it downwardly against the biasing effect of the tension springs 146. The opening of the platform 158 will raise the drive links 180 upwardly to move the drive shaft 240 upwardly in the tubes 30. The drive shaft 240 will engage the sleeve cam tracks 222A and 222B in the opposite manner to that described above with respect to the manner in which the platform and wheels are collapsed to the storage position. As the platform is lowered and the sleeves 220A and 220B are rotated open (in the directions opposite to those directions indicated by the arrows 260 and 262 in FIG. 7), the wheel carriage 156B (FIG. 12) will begin to open first, and thus provide clearance for the wheel carriage 156A to subsequently open without interference.

When the platform 158 is fully opened (FIG. 5), the drive shaft 240 is at its highest elevation on the frame and can be latched into position to hold the wheel carriages 156A and 156B and the platform 158 in the extended, operative position.

In particular, the latch assembly 268 is mounted to the frame cross tube 32 (FIGS. 5, 6, and 7). As best illustrated in FIG. 7, the latch assembly 268 has a pair of angled side members 270 joined at their outer ends by a cross member 272. The distal ends of each side member 270 are angled, at 274, to be cammed upwardly by the drive shaft 240 as the drive shaft 240 moves upwardly. Each side member 270 also defines a notch 276 for receiving the drive shaft 240 when the drive shaft 240 is at its maximum elevation relative to the frame.

The proximal ends of the latch assembly members 270 are mounted on an axle 280 which is in turn mounted at each end to a pair of brackets 282 projecting downwardly from the frame cross tube 32. A torsion spring 284 is mounted on the axle 280 and has a first extending end 286 engaged with the cross tube 32 and a second extending end 288 hooked around a bar 290 which extends between the members 270. The spring 284 thus continuously biases the latch downwardly toward the drive shaft 240. When the drive shaft 240 is moved to its maximum elevation and is received within the notches 276 of the latch assembly 268, the drive shaft 240 is locked in that position, and the luggage platform 158 and wheel carriages 156A and 156B are locked in the extended, operative positions as shown in FIG. 5.

The latch assembly 268 can be released by pulling the assembly 268 outwardly away from the drive shaft 240. This can be easily done with one's hand. Alternatively, a person can stand behind the erected carrier 20 and easily use a foot to push or kick the latch assembly 268 outwardly so as to release the drive shaft 240.

When the latch assembly 268 is released, the tension springs 146 in the frame tubes 30 pull the connector blocks 142 (FIGS. 9 and 10) downwardly (in the direction of the arrows 302). This moves the drive shaft 240 downwardly along the sleeves 220A and 220B to automatically collapse the wheel carriages 156A and 156B and platform 158 as described in detail above.

As the tension springs 146 pull the connector blocks 142 and shaft 240 downwardly, the rods 120 within each tube 30 are also necessarily pulled downwardly by the connector blocks 142 to which the rods 120 are attached. As illustrated in FIG. 9, the downward movement of the connector block 142 brings the pin 126 (at the upper end of the rod 120) into engagement with the bottom end 110 of the slot 108 in the connector pin 100. The lost motion within the connection between the pin 100 and rod 120 is thus taken up, and further downward movement of the connector block 142 causes the pin 100 to be pulled downwardly and out of the tubes 34 of the upper frame section 26. The upper frame section 26 can then be folded rearwardly along side the collapsed wheel carriages 156A and 156B adjacent the lower frame section 24. Of course, before or after the upper frame section 26 is folded rearwardly, the handle section 28 can be folded forwardly to its collapsed configuration as described above with reference to FIG. 2.

The novel hinge and pin configuration joining the upper frame section 26 to the lower section 24 greatly facilitates erection of the carrier to the extended, operative configuration. In particular, it is not required that the pin 100 be in the fully retracted position (FIG. 10) in order to return the collapsed upper frame section 26 to the erected, operative position (FIG. 1) as will next be explained.

If the platform 158 is already in the open, operative position which permits the pins 100 to be fully extended as shown in FIG. 8 and as shown in phantom by dashed lines in FIG. 13, then the upwardly pivoting movement of the tubes 34 of the upper frame section 26 will cause the bottom edges of the first hinge part bases 72 to engage the curved, distal end surfaces of the pins 100. This will cam the pins 100 downwardly, against the biasing effect of the springs 130 within the pins 100. After the upper frame section tubes 34 are pivoted to the fully upright position, the pins 100 will be urged upwardly, by the springs 130, into the receiving cavities 102 of the first hinge parts 70. This will lock the upper frame section 26 to the lower frame section 24.

Of course, even if the platform 158 is in its collapsed, storage position (FIG. 7), the upper frame section 26 can still be placed in the erect, operative configuration so that the tubes 34 of the upper frame section 26 are aligned with the tubes 30 of the lower frame section 24. This is because the pins 100 are fully retracted when the platform 158 is collapsed (FIGS. 7 and 10). The platform 158 can subsequently be grasped and pivoted downwardly to the operative position which results in the drive shaft 240 moving upwardly to permit the pins 100 to be biased upwardly by the springs 130 to the fully elevated position (FIG. 8) wherein the distal ends of the pins 100 are received within the cavities 102 of the upper frame section first hinge parts 70 so as to lock the upper frame section 26 in position on the lower frame section 24.

The novel design of the preferred embodiment of the present invention permits the platform 158 and wheel carriages 156A and 156B to be opened to the extended, operative position in a novel manner that does not necessarily require one to first grasp the platform 158 and pivot it outwardly. Instead, the sections of the frame 22 can be first extended to the operative position illustrated in FIG. i and as explained above. The platform 158 is, however, still collapsed as shown in FIG. 7.

Then, one can push generally vertically downwardly on the handle 42 so as to force the ends of the collapsed platform tubes 162 against the floor. With reference to FIG. 7, the downwardly facing ends of the tubes 162 adjacent the rear cross tube 166 would be forced against the floor. Simultaneously, the extended frame 22 can be positioned at a slight angle rearwardly so that the pivot axis defined by the pins 152 (which connect the ends of the frame section 24 with the platform side tubes 162) moves forwardly of the ends of the platform side tubes 162 which are engaged with the floor. This will cause the platform 158 to pivot outwardly from the collapsed position (FIG. 7) to the extended, operative position (FIGS. 1, 5, and 11).

The pivoting movement of the platform 158 to the open position also causes the links 180 to move the drive shaft 240 upwardly within the sleeve cam track slots 222A and 222B. The sleeves 220A and 220B are thus rotated in the directions opposite to the directions indicated by the arrows 260 and 262 in FIGS. 6 and 7. The rotating sleeves pivot the wheel carriages 156A and 156B outwardly toward the operative position. As the drive shaft 240 is driven upwardly during this process, the rods 120 in the frame tubes 30 are also driven upwardly so as to permit the pins 100 to be biased upwardly into the upper frame section 26 so as to lock the upper frame section 26 against transverse movement relative to the lower frame section 24 as described in detail above. Also, the latch 268 engages the shaft 240 at its highest elevation to lock the platform 158 and wheel carriages 156A and 156B in the operative position.

Preferably, suitable means can be employed with the carrier 20 to secure luggage or other articles to the carrier. To this end, conventional shock cords 330 may be attached to the carrier as illustrated in FIG. 1. For ease of illustration, the shock cords 330 have been omitted from all of the Figures except FIGS. 1 and 5.

Each shock cord 330 has a distal end to which is attached a conventional hook 332 which can be secured to one of the cross members or tubes of the frame 22, such as the cross tube 38 or cross tube 36.

The shock cords 330 are attached to the carrier platform 158 as best illustrated in FIG. 5. In particular, the front cross member 164 of the platform 158 defines bores 336 for receiving the shock cords 330. A portion of each shock cord 330 is passed through a bore 336, is folded over on the other side of the member 164, and is retained in the folded over configuration by a suitable wire clamp 340 to prevent withdrawal of the shock cord 330 from the cross member 164.

From the foregoing description it will be apparent that the carrier apparatus of the present invention incorporates a relatively sturdy design and is adapted to employ relatively large diameter wheels to facilitate transport. Moreover, the carrier can incorporate a unique feature wherein the large diameter wheels overlap each other in the collapsed, storage position so as to eliminate the requirement for using an excessively wide frame. As a consequence, the carrier can have a relatively compact, collapsed configuration for storage.

The present invention also permits the carrier to employ features which accommodate erection of the carrier from a collapsed state in more than one sequence of steps. Because a particular sequence of steps need not be followed in erecting the carrier, people can find the carrier easier to use.

Further, the carrier can be provided with a unique feature in which the wheels and platform are automatically latched in the opened, operative, configuration. The carrier can also be provided with a unique design in which it is easier to use because the wheels and luggage support platform automatically close together if the latch is released.

The carrier can be provided with a number of foldable frame sections and with unique locking or retaining means for locking the frame sections together in the extended, operative configuration.

It will be readily apparent from the foregoing detailed description of the invention and from the illustrations thereof that numerous variations and modifications may be effected without departing from the true spirit and scope of the novel concepts or principles of this invention.

What is claimed is:

1. A portable, collapsible, luggage carrier comprising:

a frame and a handle carried thereon;

a luggage support platform pivotally mounted to said frame for movement between a collapsed, inoperative, storage position adjacent said frame in an overlapping relationship therewith and an extended, operative position projecting outwardly from said frame;

a pair of wheel carriages on said frame which each have a rotatable wheel for transporting said luggage carrier;

a pair of spaced-apart carriage mounting means for mounting said carriages on said frame for pivoting movement between a collapsed, inoperative, storage position in which said wheels overlap each other adjacent said frame and an extended, operative position in which said wheels are disposed generally parallel to each other for rotation about a common axis; and cam actuation means for effecting said pivoting movement of said carriages in response to pivoting movement of said platform relative to frame;

said cam actuation means including (1) a first cam element on one of said carriage mounting means, (2) a second cam element on the other of said carriage mounting means, and (3) a third cam element connected with said platform and engaged with both of said first and second cam element;

said first cam element being different than said second cam element whereby the pivoting movement of said platform initiates the pivoting of said one of said carriages prior to the initiation of the pivoting of the other of said carriages.

2. The carrier in accordance with claim 1 in which
   said carriage mounting means each includes a pair of generally cylindrical, hollow sleeves mounted for rotation on said frame about parallel axes; and
   said cam actuation mans includes cam slots defined in each of said sleeves and includes a drive shaft mounted in said cam slots perpendicular to said sleeve axes whereby movement of said drive shaft along the plane defined by said axes effects rotation of said sleeves.

3. A portable, collapsible, luggage carrier comprising:

a frame and a handle carried thereon;

wheel means on said frame for transporting said luggage carrier;

a luggage support platform pivotally mounted to said frame for movement between a collapsed, inoperative, storage position adjacent said frame in an overlapping relationship therewith and an extended, operative position projecting outwardly from said frame;

platform biasing means for urging said platform toward said storage position; and releasable latch means for being moved between a latched position to retain said platform in said operative position and a released position to permit said platform to be moved to said storage position by said platform biasing means;

said carrier including (a) a shaft mounted for movement generally parallel to, and along, a portion of said frame, and (b) a link pivotally connected at one end to said shaft and pivotally connected at the other end to a portion of said platform at a location spaced from the pivotal mounting of said platform to said frame; and said platform biasing means including a tension spring biasing said shaft toward one end of said frame.

4. A portable, collapsible, luggage carrier comprising:

a frame and a handle carried thereon;

wheel means on said frame for transporting said luggage carrier;

a luggage support platform pivotally mounted to said frame for movement between a collapsed, inoperative, storage position adjacent said frame in an overlapping relationship therewith and an extended, operative position projecting outwardly from said frame;

said frame including a lower frame section and an upper frame section pivotally mounted to said lower frame section for movement between an extended, operative position and a collapsed, inoperative storage position adjacent said lower frame section;

said lower frame section including at least a first pin mounted for reciprocative movement in, and relative to, said lower frame section for projecting from, and being retracted into, said lower frame section;

said upper frame section having one end defining at least one receiving cavity for receiving a portion of said pin; and connecting means for connecting said platform with said pin to move said pin (1) out of said receiving cavity when said platform is moved to said storage position and (2) into said receiving cavity when said platform is moved to its said operative position while said upper frame section is in its said operative position whereby relative transverse displacement of said upper and lower frame sections is prevented.

5. The carrier in accordance with claim 4 in which said carrier further includes platform biasing means for urging said platform toward said storage position; and releasable latch means for being moved between a latched position to retain said platform in said operative position and a released position to permit said platform to be moved to said storage position by said platform biasing means.

6. The carrier in accordance with claim 4 in which each said lower frame section includes first and second spaced-apart lower tubes;

said upper frame section includes first and second spaced-apart upper tubes;

said first and second upper tubes are hingedly connected to said first and second lower tubes, respectively;

each said tube defines a bore;

said first pin is mounted in said lower frame section first tube for longitudinal displacement relative thereto and for movement into and out of said upper frame section first tube; and a second pin identical to said first pin is mounted in said lower frame section second tube for movement into and out of said upper frame section second tube.

7. The carrier in accordance with claim 6 in which each said pin has (1) an outer end for projecting from one of said lower frame section tubes into the hingedly connected upper frame section tube and (2) an inner end extending oppositely away from said outer end into said one lower frame section tube;

said connecting means includes (a) a bore defined in said inner end of each said pin;

(b) a slot defined by each said pin along a portion of the depth of said bore, said slot terminating short of the open end of said bore and communicating with said bore;

(c) first and second connecting rods associated with said first and second pins, respectively, each said connecting rod having a first end received in the associated pin bore and a second end projecting out of the bore beyond the associated pin inner end;

(d) an engaging guide arm projecting from each said rod first end into said slot to accommodate relative lost motion between the associated pin and said rod;

(e) a compression spring within each said bore acting between each said rod first end and the associated pin to normally urge each said pin to a maximum extended position beyond said associated rod first end;

(f) first and second links associated with said first and second rods, respectively, each said link being pivotally connected at one end to said platform and pivotally connected at the other end to said associated rod second end; and (g) first and second tension springs associated with said first and second rods, respectively, each said tension spring being connected at one end to said lower frame section and at the other end to said associated rod second end for urging said rod to (1) move the associated link to pivot said platform toward said storage position and (2) move the associated pin toward a retracted position within one of said lower frame section tubes.

8. A portable, collapsible luggage carrier comprising:

a frame and a handle carried thereon;

a luggage support platform pivotally mounted to said frame for movement between a collapsed, inoperative, storage position adjacent said frame in an overlapping relationship therewith and an extended, operative position projecting outwardly from said frame;

a pair of wheel carriages on said frame which each have a rotatable wheel for transporting said luggage carrier;

a pair of spaced-apart carriage mounting means for mounting said carriages on said frame for pivoting movement between a collapsed, inoperative, storage position in which said wheels overlap each other adjacent said frame and an extended, operative position in which said wheels are disposed generally parallel to each other for rotation about a common axis; and cam actuation means for effecting said pivoting movement of said carriages in response to pivoting movement of said platform relative to frame; and said carriage mounting means each including a pair of generally cylindrical, hollow sleeves mounted for rotation on said frame about parallel axes;

said cam actuation means including cam slots defined in each of said sleeves and a drive shaft mounted in said cam slots perpendicular to said sleeve axes whereby movement of said drive shaft along the plane defined by said axes effects rotation of said sleeves;

said carrier further including a link pivotally connected at one end to said drive shaft and pivotally connected at the other end to a portion of said platform at a location spaced from the pivotal mounting of said platform to said frame.

9. A portable, collapsible luggage carrier comprising:

a frame and a handle carried thereon;

wheel means on said frame for transporting said luggage carrier;

a luggage support platform pivotally mounted to said frame for movement between a collapsed, inoperative, storage position adjacent said frame in an overlapping relationship therewith and an extended, operative position projecting outwardly from said frame;

platform biasing means for urging said platform toward said storage position; and releasable latch means for being moved between a latched position to retain said platform in said operative position and a released position to permit said platform to be moved to said storage position by said platform biasing means;

said releasable latch means including (a) a bracket projecting from said frame;

(b) a latch member pivotally mounted to said bracket and defining a notch and, (c) a torsion spring biasing said latch member in a first direction of rotation; and said carrier including a shaft connected to said platform and adapted to move along a portion of the length of said frame in response to movement of said platform between said operative position and said storage position whereby said shaft engages said latch member and pivots said latch member outwardly to accommodate receipt of said shaft within said latch member notch when said platform is in said storage position so that said latch means torsion spring holds said latch member engaged with said shaft to latch said platform in said storage position.

10. A portable, collapsible luggage carrier comprising:

a frame and a handle carried thereon;

wheel means on said frame for transporting said luggage carrier;

a luggage support platform pivotally mounted to said frame for movement between a collapsed, inoperative, storage position adjacent said frame in an overlapping relationship therewith and an extended, operative position projecting outwardly from said frame;

platform biasing means for urging said platform toward said storage position; and releasable latch means for being moved between a latched position to retain said platform in said operative position and a released position to permit said platform to be moved to said storage position by said platform biasing means;

said carrier including (a) a rotatable sleeve on said frame, (b) a cam track slot defined in said sleeve, (c) a shaft extending through said sleeve and engaged with said cam track slot, and (d) a link pivotally mounted on one end to said shaft and pivotally mounted at the other end to a portion of said platform at a location spaced from the pivotal mounting of said platform to said frame; and said platform biasing means including a connector block mounted to said shaft for movement along said frame and includes a tension spring connected between said connector block and said frame for urging said connector block and shaft toward one end of said frame to effect pivoting movement of said platform from said operative position to said storage position.

11. The carrier in accordance with claim 10 in which said wheel means includes a wheel carriage mounted to said sleeve for rotation therewith;

said frame includes a cylindrical tube having a pair of diametrically opposed, elongate slots;

said sleeve is concentrically mounted around said frame tube for rotation about a longitudinal axis coincident with the longitudinal axis of said frame tube;

said sleeve defines a pair of said cam track slots diametrically opposed to each other; and said shaft is received within said tube elongate slots and within said sleeve cam track slots.

* * * * *